(12) United States Patent
Bailey

(10) Patent No.: US 8,386,098 B2
(45) Date of Patent: Feb. 26, 2013

(54) METHOD FOR A DEEPER SEARCH IN A TIME-LIMITED IMAGE SATELLITE PLANNING ENVIRONMENT

(76) Inventor: David A. Bailey, Glendale, AZ (US)

( * ) Notice: Subject to any disclaimer, the term of this patent is extended or adjusted under 35 U.S.C. 154(b) by 786 days.

(21) Appl. No.: 12/534,789

(22) Filed: Aug. 3, 2009

(65) Prior Publication Data

US 2011/0025554 A1 Feb. 3, 2011

(51) Int. Cl.
*G05D 1/00* (2006.01)
*G01C 21/24* (2006.01)
(52) U.S. Cl. .................... 701/13; 701/529; 701/531
(58) Field of Classification Search .................. None
See application file for complete search history.

(56) References Cited

U.S. PATENT DOCUMENTS

| | | | | |
|---|---|---|---|---|
| 6,023,291 A * | 2/2000 | Kamel et al. | ............ | 348/147 |
| 6,259,988 B1 * | 7/2001 | Galkowski et al. | ............ | 701/533 |
| 6,302,354 B1 * | 10/2001 | Patera | ............ | 244/3.15 |
| 8,082,102 B2 * | 12/2011 | Ravenscroft | ............ | 701/301 |
| 2003/0093219 A1 * | 5/2003 | Schultz et al. | ............ | 701/202 |
| 2003/0167109 A1 * | 9/2003 | Clarke et al. | ............ | 701/3 |
| 2005/0197749 A1 * | 9/2005 | Nichols et al. | ............ | 701/3 |
| 2010/0140413 A1 | 6/2010 | Bailey | | |

OTHER PUBLICATIONS

Secrest.pdf (Barry R. Secrest, Traveling Salesman Problem for Surveillance Mission Using Particle Swarm Optimization, 2001, Air Force Institute of Technology, pp. i-82).*

* cited by examiner

*Primary Examiner* — Khoi Tran
*Assistant Examiner* — Bao Long T Nguyen
(74) *Attorney, Agent, or Firm* — Christie, Parker & Hale, LLP

(57) ABSTRACT

The present invention relates to image satellite planning, and more particularly to a method for allowing a deeper search for high value targets in a time-limited planning environment. In an exemplary embodiment, a method of computing an ordered subset of targets includes using an approximation for the time needed for the satellite to re-orient to a new target, rather than calculating each maneuver time between targets. By approximating the maneuver time rather than calculating it, the calculation time is reduced. Each iteration through the traveling salesman problem takes less time, and more iterations can be accomplished between imaging windows. The iterative process can search deeper into the traveling salesman problem to find a better solution.

19 Claims, 4 Drawing Sheets

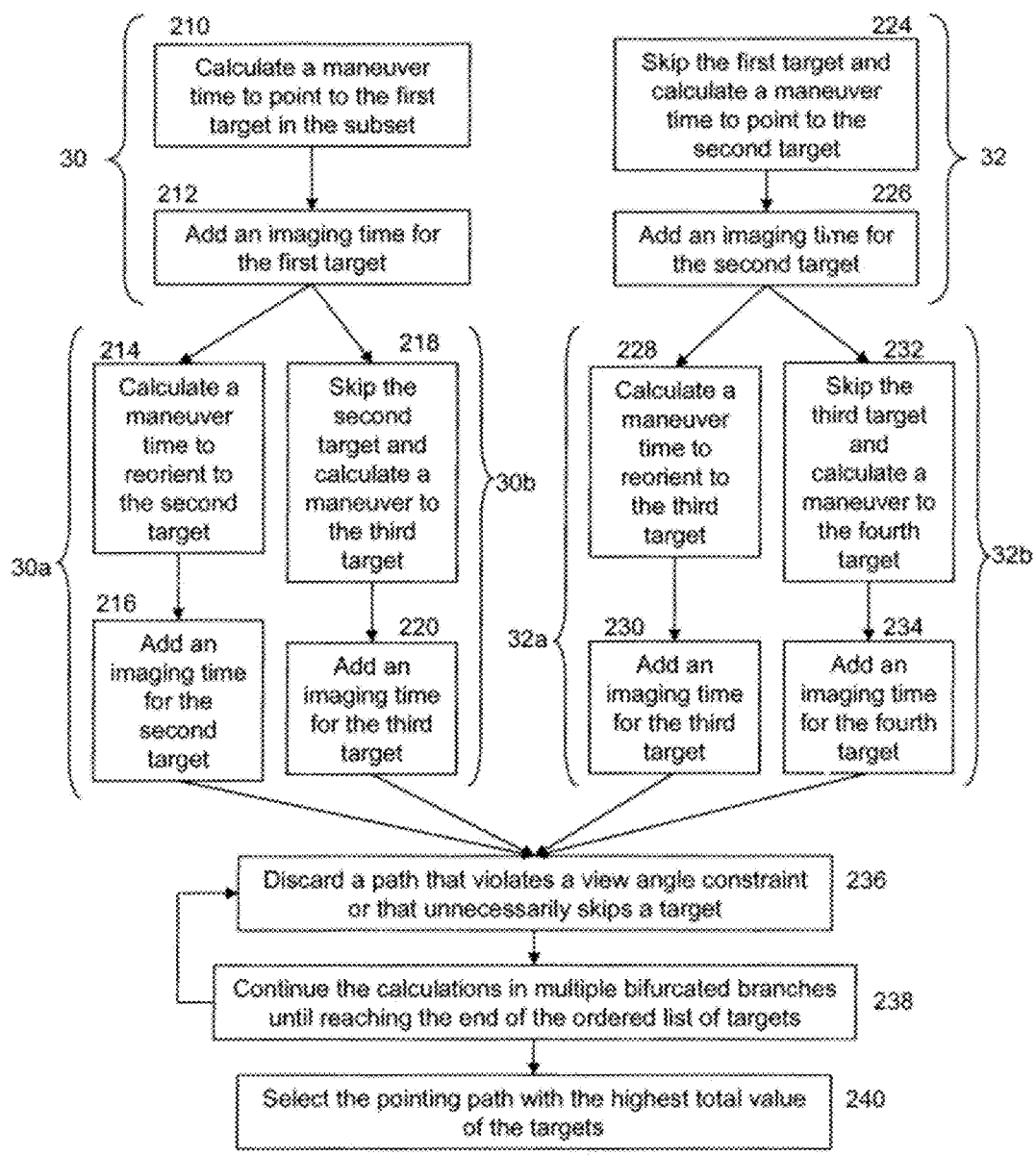

METHOD FOR A DEEPER SEARCH IN A TIME-LIMITED IMAGE SATELLITE PLANNING ENVIRONMENT

FIELD OF THE INVENTION

The present invention relates to image satellite planning, and more particularly to a method for allowing a deeper search for high value targets in a time-limited planning environment.

BACKGROUND

Image satellite planning is a planning process used to determine the pointing path that an imaging satellite takes as it passes over a set of targets on the ground. In many imaging satellite planning problems, there are more targets on the ground than the satellite can point to and image in the amount of time that the satellite is able to view the targets. Thus, a subset of targets are selected and ordered, based on the value and location of the targets, to provide the highest value targets at the lowest cost. The problem of determining the optimal set of ordered targets that the satellite should image during its pass can be categorized as a traveling salesman problem.

The traveling salesman problem as proposed by Karl Menger's "Botenproblem" was presented in Vienna in 1930. A salesman travels to a set of cities, and incurs a cost for traveling from one city to the next city. The problem is determining the order in which he should travel to the cities, to minimize the cost of traveling between them. The best solution is an ordered subset of the cities that minimizes the total cost to travel to all of the cities. This is a member of the class of mathematical problems that are known as NP-complete (non-polynomial time complete). Even for a moderately complicated NP-complete problem, the computation of the optimal solution using modern computers may require billions of years.

A variation of the traveling salesman problem is when there are more cities or stores to call on than the salesman can visit in a given week. Thus, the solution requires not only putting the stores in the best order, but also selecting which stores the salesman should skip. At each store the number of sales the salesman makes is proportional to the amount of product the individual store has sold since the salesman's last visit. The sales rate for each store is different, and the cost of going from one store to the next is unique. The problem is determining on each given day what stores does the salesman call on and in which order, such that the maximum value of stores for the minimum cost is achieved. This is the form of the traveling salesman problem that is solved in deciding which targets a satellite collects in a given pass over a data rich area.

An example of a data rich environment is the surveillance of all the gasoline stations in Los Angeles County. The value of imaging a particular gas station is proportional to the number of days since the last image was taken, multiplied by the number of pumps at the gas station. Thus, the value of each gas station is different. The cost to image a particular station is the time to reorient the satellite from gas station A to point to gas station B. Thus, the cost of reorienting the satellite between any two gas stations is different. The desired solution is an ordered subset of targets that maximizes the total value of the imaged targets and minimizes the cost. FIG. 1 shows a typical set of targets 12 and the satellite pointing path 14 to collect the selected targets 12a, 12b, 12c, etc.

The computation time to solve this problem for the best solution usually exceeds the amount of time available between imaging windows. That is, the best solution cannot be derived before the satellite is passing over the targets again. Therefore, an iterative approximation to the solution is used. Each iteration through the traveling salesman algorithm searches for a subset of targets that increases the sum of the values of the images, without the sum of the maneuver times or the imaging times exceeding the imaging window time (the amount of time that the satellite is available to view the targets).

Some prior art methods of solving this problem use a two-step process. First, the problem is iterated to obtain an ordered subset of targets with a high total value and low cost. This solution is not necessarily the most optimal solution to the problem, but it is the best solution that the iterative approximation can locate during the limited time between satellite imaging passes. Second, the ordered subset is validated through a more detailed simulation that makes small timing corrections. The final ordered subset is then transmitted to the satellite to execute.

However, the iterative process cannot fully explore the traveling salesman problem before the calculation window is over and the list of targets is validated and sent to the satellite to execute. Accordingly, there is a need for an improved method of solving the satellite imaging problem.

SUMMARY OF THE INVENTION

The present invention relates to image satellite planning, and more particularly to a method for allowing a deeper search for high value targets in a time-limited planning environment. In an exemplary embodiment, a method of determining a pointing path for a satellite includes using an approximation for the time needed for the satellite to re-orient to a new target (the maneuver time), rather than calculating each maneuver time between targets. That is, rather than calculating an actual time for the satellite to maneuver to point to the next target, this maneuver time is estimated. By approximating the maneuver time rather than calculating it, the calculation time is reduced. As a result, each iteration through the traveling salesman problem takes less time, and more iterations can be accomplished between imaging windows. The iterative process can search deeper into the traveling salesman problem to find a better solution.

In one embodiment, a method for determining a pointing path of a satellite for imaging a group of targets includes determining by a computer system an estimated cost of reorienting the satellite between two targets in the group. The estimated cost is an estimated maneuver time for reorienting the satellite between the two targets. The method also includes generating by the computer system an ordered subset of the targets that maximizes a total sum of the values of the targets in the subset and minimizes a total sum of the estimated costs of reorienting the satellite between ordered pairs of targets in the subset. The method also includes calculating by the computer system an actual maneuver time for reorienting the satellite between ordered pairs of targets in the subset, and modifying by the computer system the ordered subset based on the calculated actual maneuver times. The method also includes generating by the computer system a pointing path for the satellite for imaging, via the satellite, the targets in the modified ordered subset.

In another embodiment, the method further comprises outputting by the computer system the pointing path comprising the modified ordered subset, transmitting the pointing path to the satellite, and imaging by the satellite the targets in the pointing path.

BRIEF DESCRIPTION OF THE DRAWINGS

FIG. 6 is a flow diagram showing a portion of a process for determining a pointing path, according to an exemplary embodiment of the invention.

DETAILED DESCRIPTION OF THE INVENTION

The present invention relates to image satellite planning, and more particularly to a method for allowing a deeper search for high value targets in a time-limited planning environment. In an exemplary embodiment, a method of determining a pointing path for a satellite includes using an approximation for the time needed for the satellite to re-orient to a new target (the maneuver time), rather than calculating each maneuver time between targets. That is, rather than calculating an actual time for the satellite to maneuver to point to the next target, this maneuver time is estimated. By approximating the maneuver time rather than calculating it, the calculation time is reduced. As a result, each iteration through the traveling salesman problem takes less time, and more iterations can be accomplished between imaging windows. The iterative process can search deeper into the traveling salesman problem to find a better solution.

Prior art methods of determining a pointing path for a satellite calculating an actual maneuver time for the satellite to point to a new target, in order to solve for an ordered subset of targets that the satellite should image during its pass. That is, in each iteration through the traveling salesman problem, the computer performing the iterations calculates this time. The computer is looking for an ordered subset of targets that fills the imaging window, and is iterating through various possible subset to find the subset of targets with the highest total value and lowest total maneuver times (the time during which the satellite is maneuvering to point to the next target). The maneuver times are actually calculated for each pair of targets, which is a time-intensive calculation. Thus, the computer is not able to search through all possible subsets to find the best one. In embodiments of the present invention, the maneuver time is estimated during this iterative process, rather than actually calculated. As a result, each iteration takes less computational time, and more iterations can be performed. Thus, more subsets can be evaluated during the computational window, to find the subset with the highest value and lowest cost.

Figure 1:
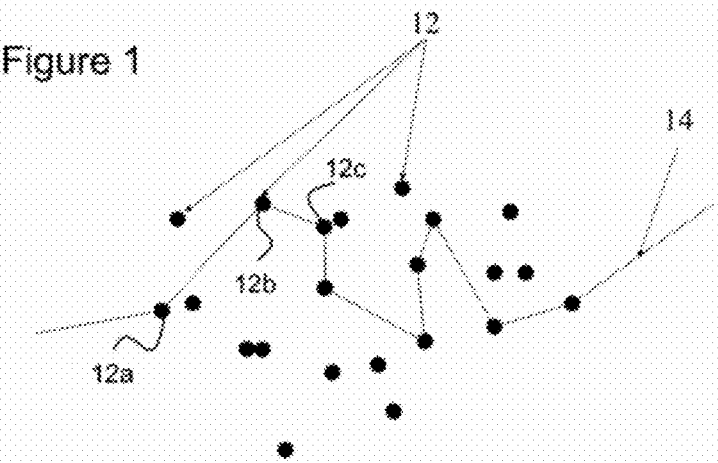
FIG. 1 is a representation of a group of targets and a satellite pointing path through the targets.

FIG. 1 shows a set of targets 12 and a satellite pointing path 14. The pointing path 14 shows which targets the satellite points to and images as the satellite passes over the targets, and the order in which the targets are imaged. In many situations, there are more targets 12 than the satellite can image during a single pass. As a result, the pointing path 14 cannot include all of the targets 12 in the group. The satellite follows the pointing path to point to a first target 12a and take an image, then execute an attitude maneuver to point to a second target 12b, take an image of target 12b, execute another maneuver to point to a third target 12c, and so on, until the imaging pass is over.

Figure 5A:
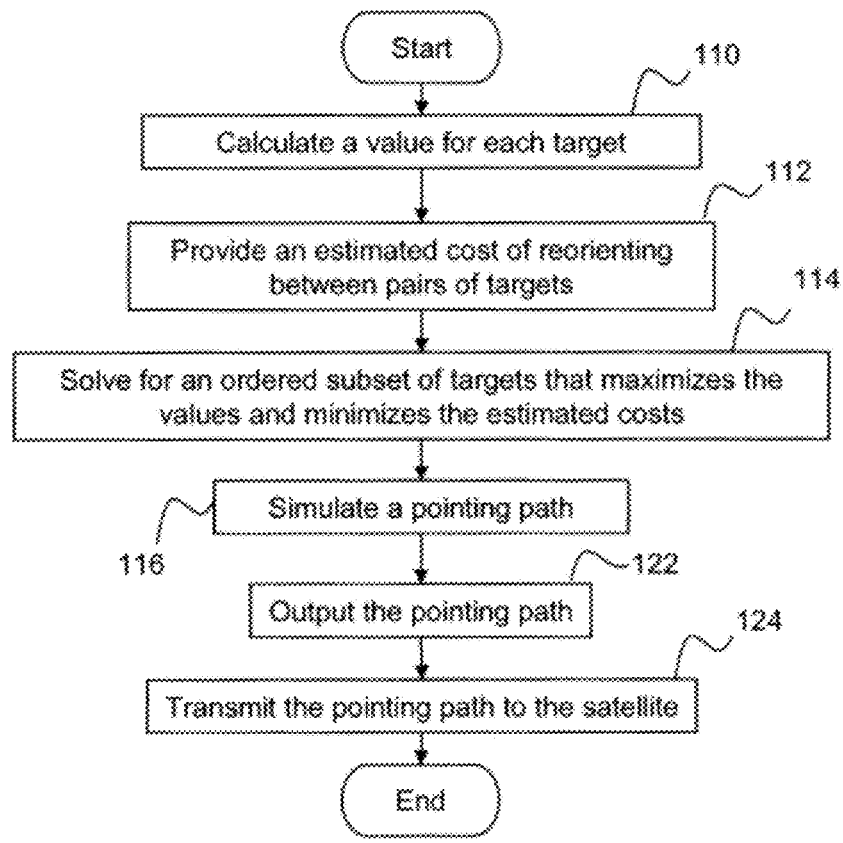
FIG. 5A is a flow diagram showing a process for determining and transmitting a pointing path of a satellite for imaging a group of targets, according to an exemplary embodiment of the invention.

When the imaging pass is over, calculations for the next pass begin, in order to prepare the satellite pointing path 14 for the next imaging pass. FIG. 5A is a flow diagram of a process executed by a computer system for determining a pointing path for a satellite for imaging a group of targets according to one embodiment of the invention. The process starts and calculates a value for each target in the group in step 110. According to one embodiment, this calculation depends on the particular group of targets, how frequently they have each been imaged, and the relative importance of each target. For example, in the scenario of imaging the gasoline stations in Los Angeles County, the value of each target can be calculated by taking the amount of time since an image of the target was last taken, multiplied by the number of pumps at the station. Gasoline stations that have not been imaged recently, and those with relatively high numbers of pumps would tend to have higher values than gasoline stations that had been imaged recently or had fewer pumps. In some scenarios, the value of a target drops to zero as soon as it has been imaged, and does not come back up until a certain amount of time, such as, for example, a week, has passed. The amount of time that the value stays at zero may differ for each target, depending on its importance. In other scenarios, other factors may be used to calculate a target's value, depending on the situation, as will be understood by a person skilled in the art.

In another embodiment, the process starts in step 112, as the values of the targets have already been calculated (as described further below in reference to FIG. 4). In step 112, the process provides an estimated cost of reorienting the satellite between pairs of targets in the group. The cost of reorienting is the time that the satellite takes to execute a maneuver to re-orient itself to point to the next target. This reorienting time is a cost because it is lost time during which the satellite can view the targets but is not taking images. In exemplary embodiments, the cost is an estimated cost rather than a calculated, exact cost. That is, rather than actually calculating the time that it will take the satellite to maneuver between two targets in the group, the maneuver time is estimated. Calculating the times for the maneuvers involves solving a set of differential equations, and repeating this calculation for each pair of targets added to the pointing path. Each of these calculations takes up computational time during the limited time period between satellite imaging passes. By estimating each maneuver time rather than making this calculation, the time that it takes to provide the cost of reorienting in step 112 is reduced. Additional information on the equations that govern the maneuver time-angle problem and other background on satellite dynamics can be found in "Space Vehicle Dynamics and Control", Bong Wie, AIAA Education Series, ISBN 1-56347-261-9.

Figure 2:
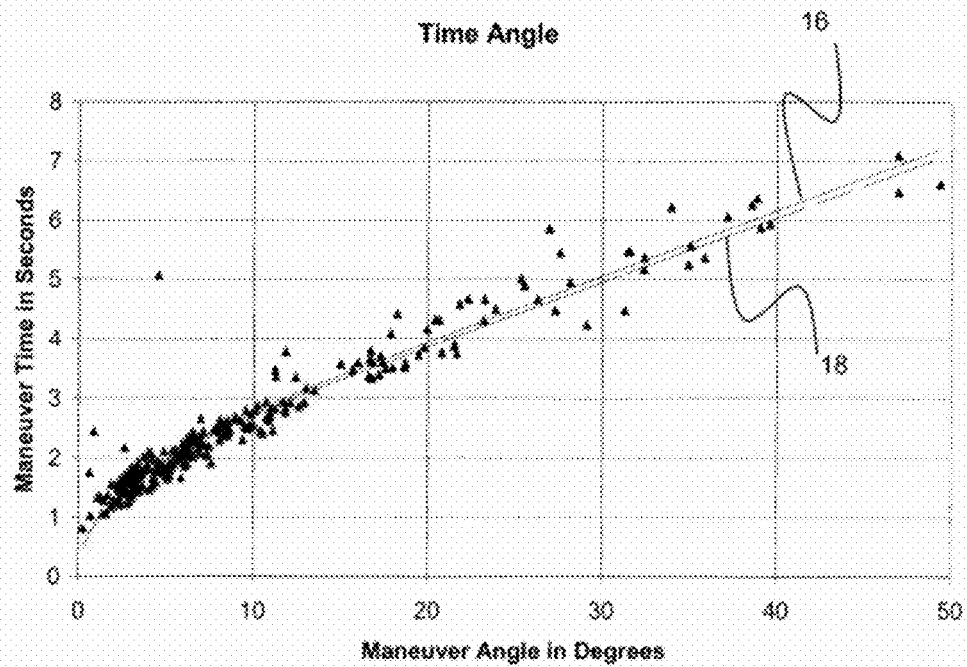
FIG. 2 is a time-angle plot for a satellite, according to an exemplary embodiment of the invention.

In exemplary embodiments, the estimated cost is obtained from the data on a time-angle plot for the satellite. An example of a time-angle plot is shown in FIG. 2. The time-angle plot in FIG. 2 includes data points plotted with the duration of the maneuver on the y-axis (in seconds) versus the angle of the maneuver on the x-axis (in degrees). A larger maneuver angle means the satellite moves through a wider angle to point to a new target. Two targets that are very close to each other have a smaller maneuver angle than two targets that are located farther apart. Generally, the larger the maneuver angle, the longer the duration of the maneuver. A curve fit 16 that best fits the data points is generated and added to the chart. In one embodiment, the curve fit is a constant jerk, constant acceleration, constant velocity minimum squared error curve fit. The time-angle plot can be populated with actual data from the satellite, based on past maneuvers, or it can be simulated, based on a theoretical model of a satellite. The time angle plot in FIG. 2 is simulated.

According to an embodiment, each satellite, or each type of satellite, has its own time-angle plot, whether based on actual data from the satellite or a simulation of the satellite. The amount of time a particular satellite needs for a particular maneuver depends on the number, location, and orientation of the control moment gyroscopes on the satellite, as well as the satellite's inertia. Additionally, the time-angle plot for a particular satellite changes over time, as the satellite burns fuel, which reduces its total mass and can change its center of gravity. Accordingly, the time-angle plot for a particular satellite can be updated periodically, such as once per year.

In an exemplary embodiment, providing the estimated cost of reorienting the satellite between two targets in step 112 includes calculating the angle between the two targets and then referring to the time-angle plot to determine the maneuver time. The angle between any two targets in the group is easily and quickly calculated, as the locations of the two targets and the satellite's trajectory are known. Thus the angle between the two targets as viewed from the satellite's position at any point in its trajectory can be quickly calculated for any pair of targets in the group. Then, for a given angle, the corresponding estimated maneuver time is quickly obtained from the curve-fit on the plot. This estimated maneuver time is obtained more quickly, with less computational time, as compared to individually calculating the actual maneuver times.

In an exemplary embodiment, the estimated maneuver time that is taken from the time-angle plot is about 1-3% less than the curve fit 16. That is, the estimated time is taken from a second curve 18 (shown in dotted lines), which is reduced from the best curve fit 16 by 1-3%, or in other embodiments by 2-3%. Thus, the curve fit 18 is 97-99% of the best curve fit 16, or 97-98%. In other embodiments, the reduction can be greater than 3%, such as a 5% or a 10% reduction. In other embodiments, the reduction can be less than 1%, such as a 0.75% or a 0.5% reduction.

The reduced curve fit 18 is an optimistic curve fit, as it estimates that each maneuver will take less time than the best curve fit 16 predicts. Thus, when the best subset of targets for the imaging pass is chosen (as explained below), and the actual maneuver times are calculated, it is likely that the subset will include more targets than the satellite can actually image during the pass. The actual, calculated maneuver times may be longer than the optimistic estimated maneuver times from the curve 18. Therefore, one or more of the targets will be dropped from the subset prior to uploading the final pointing path to the satellite, as explained in more detail below.

An optimistic curve fit 18 is used because it is preferable to drop excess targets from the pointing path than to generate a path that has too few targets. If the maneuver time estimates were taken from the best curve fit 16, some of these estimates may be longer than the actual maneuver times (as is the case for some of the data points on the plot in FIG. 2, which are below the curve 16). As a result, the satellite could finish its pointing path with time to spare in the imaging pass, because the maneuvers took less time than predicted. This is wasted time, when the satellite can view the targets but is not taking any images because it has already imaged the last target in its pointing path. Accordingly, the optimistic curve 18 is used to provide estimated maneuver times during the iterative calculations, in order to make sure that all of the time in the imaging pass is used. As mentioned above, in one embodiment the optimistic curve 18 is reduced by 1-3% from the best curve fit. If the optimistic curve fit is reduced by too much, such as 20% or more, then too many targets will need to be removed from the subset when the actual maneuver times are calculated, as described in more detail below.

In one embodiment, the time-angle plot such as the one shown in FIG. 2 is prepared separately and ahead of time, before the computational window for the imaging pass begins. Then, during the computational window, the computer device doing the calculations can quickly reference this plot to obtain an estimated cost for reorienting the satellite between a pair of targets in the group. As mentioned above, providing an estimated maneuver time by referencing the time-angle plot is faster than calculating each maneuver time. In an exemplary embodiment, the computational time to obtain this estimated maneuver time is ten times faster than the computational time to actually calculate the maneuver time. This reduction in computation time allows many more iterations to be calculated during the computational window between satellite imaging passes.

Referring again to FIG. 5A, in step 114, the process solves for an ordered subset of targets that maximizes the total value of the targets in the subset and minimizes the total estimated cost of pointing to all of the targets in the subset. The ordered subset is a subset of the targets in the group, listed in the order that they should be imaged. Thus, the ordered subset lists target 12a, then 12b, then 12c, etc., in order (referring to FIG. 1). Consecutive pairs of targets, such as 12a and 12b, or 12b and 12c, are referred to as ordered pairs of targets in the subset. In exemplary embodiments, the process of solving for the ordered subset of targets is an iterative calculation. The iteration includes picking a first ordered subset of targets, calculating the time necessary to image them (the sum of the times for imaging the targets), estimating the total cost of imaging them (the sum of the estimated times from the time-angle plot for maneuvering to the targets), and calculating a sum of the values of the targets. The iteration then moves on to select a different subset of targets and repeats the calculations. The iteration searches for the subset that has the highest total value of targets for the lowest total cost.

This iterative process is known in the field, and there are various known methods that can be used to select what the next subset of targets will be, for the next iteration. For example, in one method, the iteration starts by selecting the five targets with the highest values from the group, and determining how much time is left in the imaging window after these five targets are imaged. This includes calculating the time for pointing to and imaging each of the five targets. In the next iteration, a sixth target is added to the subset, and in the next interation, a seventh target is added, until the imaging window is filled. When the imaging window is filled, the next iteration removes one of the targets in the subset that has a long maneuver time—one that is farther from the other targets, so that the satellite has to travel over a larger path to point to this target. The iteration then adds other targets to the subset to fill the time left by the removed target, and recalculates the total value of the targets. This is just one example, and other methods of selecting a first initial subset of targets and iterating through additional subsets are known in the field. The present invention is not limited to any particular method of moving through this iteration.

The iteration moves through as many subsets of targets as it can during the allotted computational window, looking for the subset with the highest total value and the lowest total estimated cost. The output of this iterative process is an ordered subset of targets. This subset may not be the best possible solution to the problem, but it is the best solution that the iterative process can find in the allotted computational time. Thus, when the terms "maximize the value" and/or "minimize the cost" are used herein in referring to the iterative process, they mean the maximum value and minimum cost that can be found during the allotted computation time, and not necessarily the absolute maximum value and/or minimum cost that is theoretically possible. In embodiments of the invention, because the computational time for each iteration is reduced by estimating the maneuver times rather than calculating them, more iterations can be accomplished during the computational window, to search for a better solution.

In an embodiment, solving 114 includes applying constraints to the problem to make sure that the resulting ordered subset does not violate the constraints. For example, one constraint is the duration of the imaging window. The satellite can view and image the targets for only a set duration of time (the imaging window) before the satellite moves beyond the targets and they are no longer in view. There could be other limits on the imaging window as well. The total time that the satellite takes to image the targets and the total maneuver time (to re-orient between targets) must not exceed the imaging window. In one embodiment, the imaging window is within the range of about 10 minutes to about 30 minutes.

Another constraint is called the view angle constraint. The view angle is the angle between the satellite and the horizon, as seen from a target on the ground. From the target, one line can be drawn up to the satellite, and another line can be drawn to the horizon below the satellite. The angle between the two lines is the view angle. In order for the satellite to take an image of the target, the view angle must be above a certain minimum angle. If the view angle is too small, then tall buildings or land features can come between the satellite and the target and obstruct the satellite's view. For example, a low building can be obstructed by a taller building if the satellite is low in the sky, viewing from a low view angle. During the iterations in step 114, the targets in the ordered subset are constrained by this view angle. The view angle constraint can depend on the particular satellite as well as the targets being imaged, and may range between about 25 to about 60 degrees.

Figure 5B:
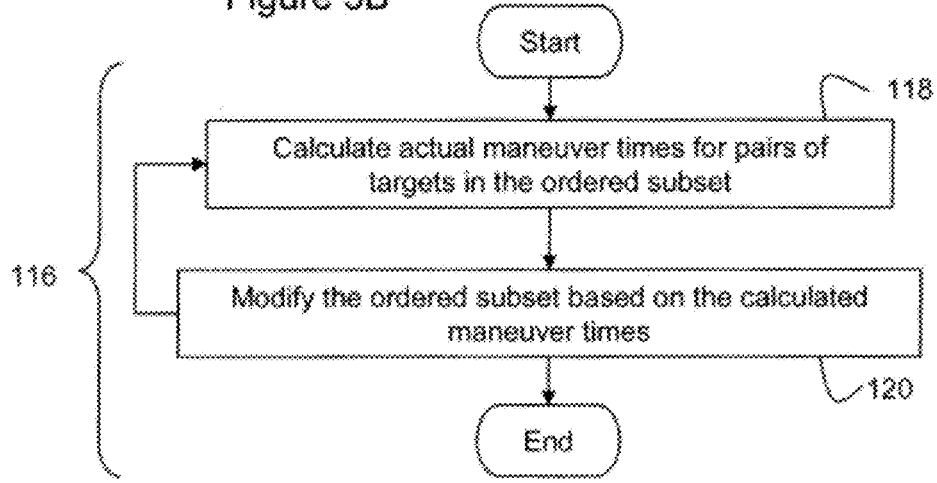
FIG. 5B is a flow diagram showing a portion of a process for determining a pointing path, according to an exemplary embodiment of the invention.

After the iterative process produces an ordered subset, the process simulates a pointing path in step 116. Simulating the pointing path 116 includes simulating the path of the satellite through its orbit as it points to and images the targets in the subset and generating a final pointing path to transmit to the satellite. This simulation is more detailed and accurate than the iterative solution in step 114 and produces the final pointing path for the imaging pass. The ordered subset that is provided by the iterative process in step 114 is not the final pointing path that is uploaded to the satellite. As mentioned above, the iterative process 114 uses estimated maneuver times rather than calculated maneuver times, which are used in step 116. FIG. 5B is a more detailed flow diagram of step 116, according to one embodiment. As illustrated in FIG. 5B, simulating the pointing path 116 includes calculating actual maneuver times for the ordered pairs of targets in the subset in step 118, and modifying the ordered subset in step 120 to replace the estimated maneuver times with calculated maneuver times and make any other necessary changes.

Calculating the maneuver times 118 includes solving the differential equations defining the maneuver time-angle problem to find the time needed for the satellite to re-orient itself from a first pointing position (pointed at a first target) to a second pointing position (pointed at a second target). The actual time for the maneuver depends on the angle between the targets as referenced in the satellite coordinate system. The equations are solved using numerical integration. Notably, fewer maneuver calculations are needed at this point than during the iterative computation, because the number of targets has been limited to those in the subset, rather than all the targets in the group. Thus, the maneuver times are actually calculated only for ordered pairs of targets in the subset, rather than calculating them for many more targets during the iterative phase as is done in the prior art. The numerical calculation of the maneuver times is shifted from the iterative phase 114 to the more detailed simulation phase 116. As a result, the time-intensive calculations are performed only for a reduced number of targets.

When the maneuver times for the targets in the subset are calculated, it is likely that the total time for the satellite to point to and image every target in the subset is greater than the imaging window, because the estimated maneuver times are optimistic (taken from curve 18). Thus, in the simulation, one or more targets in the subset are likely to violate the view angle constraint of the satellite due to the fact that the calculated maneuver times are longer than the estimated maneuver times, and the satellite will be too far along its path to look back and view one or more of the targets.

Thus, the step 116 also includes modifying the ordered subset in step 120 based on the calculated maneuver times to produce a final pointing path. Modifying the ordered subset 120 includes both replacing the estimated maneuver times with calculated maneuver times, and, in some embodiments, dropping one or more targets from the subset in order to satisfy the view angle and imaging time constraints. In one embodiment, calculating the maneuver times 118 and modifying the ordered subset 120 happen in parallel, as one maneuver is calculated and the subset is modified, and then the next maneuver is calculated and the subset is modified, and so on, as illustrated in more detail in FIG. 6.

In modifying the subset 120 to produce the final pointing path, a computer system runs parallel computations that simulate the pointing path of the satellite through the ordered subset. A portion of this simulation according to an embodiment is shown in FIG. 6. As shown in FIG. 6, a first computation branch 30 calculates the maneuver time to point the satellite to the first target in step 210, and adds the imaging time for imaging the first target in step 212. The imaging time can be taken from the data file that was outputted by the iterative process 114, or it can be calculated. The computation branch 30 can proceed to simulate the maneuvers and imaging times for all of the targets in the subset, creating a simulated pointing path of the satellite through the entire ordered subset with the list of targets in order, the imaging time for each, and the maneuver between each target.

However, as mentioned above, a pointing path that includes all targets in the subset may likely violate the view angle constraint. In this scenario, the pointing path will require the satellite to image a target that is at too low an angle, because the maneuvers have taken longer than estimated. Thus, in exemplary embodiments, the ordered subset is modified, based on the actual calculated maneuver times, in order to comply with the view angle and imaging window constraints.

Accordingly, a second computation branch 32 simulates a second pointing path in parallel with the first computation branch 30. The second branch 32 skips the first target in the ordered subset and calculates the maneuver to point the satellite directly to the second target in the subset 224, and adds the imaging time for the second target 226.

Each branch can further bifurcate when it reaches a low-value target, with one sub-branch imaging the target and another sub-branch skipping the target. For example, as shown in FIG. 6, the first branch 30 bifurcates into two branches 30a, 30b, with branch 30a calculating the maneuver to the second target 214 and adding the image time for the second target 216, and the branch 30b skipping the second target and calculating a maneuver to the third target 218, and adding an imaging time for the third target 220. A similar bifurcation is shown for branches 32a and 32b, with branch 32a calculating a maneuver to the third target 228 and adding the imaging time for the third target 230, while branch 32b skips the third target 232 and adds imaging time for the fourth target 234. According to one embodiment, all four of these branches 30a, 30b, 32a, 32b operate in parallel.

As the branches operate in parallel, they create different simulations of the pointing path. For example, when branches 30b and 32a each calculate the maneuver to the third target, the branch 30b uses the attitude and ephemeras from the first target as the starting conditions for the maneuver, and the branch 32a uses the attitude and ephemeras from the second target as the starting conditions, since branch 32a skips the first target. The ephemeras will also differ in each branch depending on how many targets have been skipped, as the satellite may be farther along its orbit in one branch than another.

In an embodiment, the computations do not necessarily bifurcate at every target. Instead, a branch bifurcates when it reaches a target that has a lower value than the other targets already imaged in the branch, or lower than an average of the other targets in the branch, or lower than some number of other targets in the branch. For example, in FIG. 6, the second target is a lower value than the first target. Thus, branch 30 bifurcates into branches 30a, 30b, with branch 30b skipping the low-value target and moving on. The same is shown for branches 32a, 32b. Also, because the first target is by default the lowest value target in the path, the branches bifurcate at the very first target, which is why two branches 30, 32 are shown with the branch 32 skipping the first target. In other embodiments, the first target is not necessarily skipped. As an example, in a simulation with 30 targets, about 5 targets may be low-value targets that are dropped in various branches over the course of the simulation.

The process also includes discarding any branch or path that violates a view angle constraint or unnecessarily drops a target, in step 236. When several branches are running in parallel, it will become apparent at some point that one or more of the branches can be discarded. Thus, some of the branches may be terminated before they reach the end of the ordered subset. For example, a branch that does not skip any targets will most likely eventually violate a view angle constraint, at which point the branch can be terminated. This happens when the satellite is too far forward along its trajectory to look back and image a target in the subset. As another example, referring to FIG. 6, both branches 30b and 32a have skipped one target each. Branch 30b imaged the first target and skipped the second, and branch 32a skipped the first target and imaged the second. Most likely, one of these two paths is better than the other (based on the value of the first and second targets), so one of the two branches can be terminated. As another example, as the branches simulate further through the ordered subset, it may become clear that the satellite can image the first several targets, including one or more low-value targets, without violating any constraints. Any branches that skipped those targets can be terminated. In an embodiment, there are typically not more than about 5-6 branches running in parallel at any given time.

In other embodiments, the branches may be bifurcated in different ways, based on different criteria, and more or fewer branches may run in parallel. FIG. 6 shows the branches bifurcating at the first, second, and third targets, but this scenario is not necessarily the case every time. For example, if the second target is higher value than the first, the branch 30 may not necessarily bifurcate to skip it.

As some branches are discarded, other branches continue to run and further bifurcate. Thus, the method includes continuing the calculations in multiple bifurcated branches until reaching the end of the ordered subset, in step 238. Continuing the calculations 238 and discarding various branches 236 can happen simultaneously, as the calculations progress.

When the parallel branches reach the end of the ordered subset, the method includes selecting the pointing path with the highest total value of the targets in step 240. Thus, the pointing path with the highest total value that does not violate any view angle constraints is the final pointing path. This pointing path will likely have one or more low-value targets removed, in order to satisfy the view angle constraint. Thus, referring back to FIG. 5B, modifying the ordered subset 120 includes creating a new pointing path with calculated maneuver times instead of estimated maneuver times, and, in many cases, with one or more targets removed from the subset.

Notably, the use of parallel processing to simulate the pointing path 116 offsets the additional maneuver time calculations that are performed during this stage. Because maneuver time estimates are used during the iterative process, to save time, the numerical integration to calculate the actual maneuver times is shifted to the simulation phase 116. These calculations are done in parallel by the different computational paths (such as 30, 32), so that the time needed to simulate the pointing path in step 116 is not increased.

The pointing path with the highest total value that does not violate any view angle constraints is the final pointing path. The simulation phase 116 generates the final pointing path, and the process then includes outputting the final pointing path 122 (FIG. 5A), and transmitting the pointing path to the satellite 124. Transmitting the pointing path to the satellite includes checking the pointing path and translating it into commands that tell the satellite the maneuvers to perform and the imaging sensors to activate in the appropriate order, to point to the first target, take an image, point to the second target, and so on. The commands are transmitted to the satellite 26 by a transmitter 24, as shown in FIG. 4. The transmitter may be, for example, an antenna or a telescope. The satellite takes the images of the targets, and the images can be transmitted by the satellite back to the ground where they are displayed.

Figure 4:
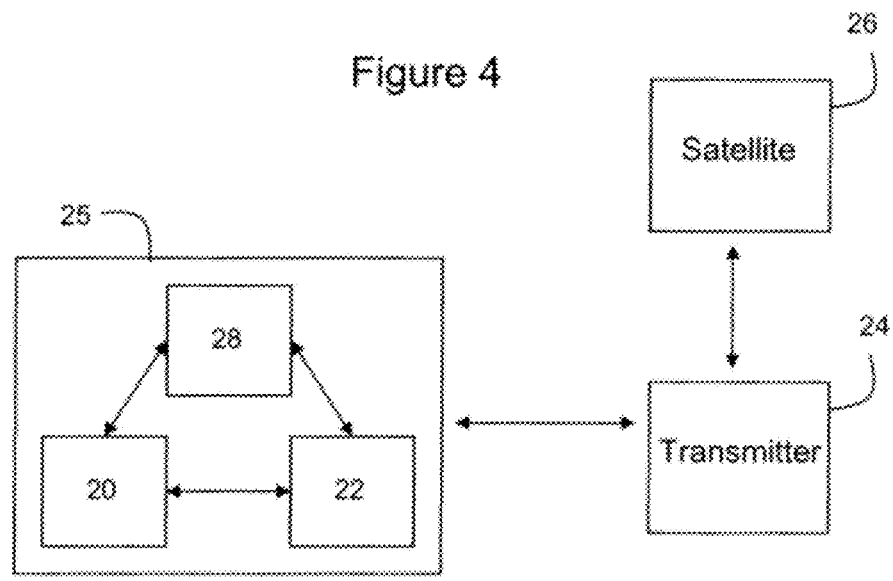
FIG. 4 is a schematic representation of a computer system, a transmitter, and a satellite, according to an exemplary embodiment of the invention.

The calculations described above to produce the pointing path are performed by a computer system 25, as shown in FIG. 4. According to one embodiment, the computer system 25 includes a first array of computer devices 20 and a second array of computer devices 22. Each array includes multiple computer processors working concurrently to execute computer instructions stored in corresponding memory devices. In one embodiment, the two arrays of computer devices both have access to a database 28 hosted in a hard disc drive or drive array.

In exemplary embodiments, the iterative solving step 114 is performed by the first array of computers 20. Providing an estimated cost in step 112 can also be done by the computer array 20, by accessing a database such as database 28 to obtain an estimated maneuver time from the curve fit 18.

Calculating the value for each target in step 110 may be done by the same computer array 20, before or during the iterating 114. Alternatively, calculating the values 110 can be done by a different, third array of computers in the system 25 or by a different computer system, before the iterations begin, and the values can be stored in a database such as database 28 accessible by the computer array 20. These values can be continuously re-calculated and updated. Likewise, the time-angle plot and the optimistic curve 18 for the satellite can be prepared ahead of time, such as by the third array of computers in system 25 or by a fourth array of computers in system 25 or by another computer system, and also stored in a database that is accessible by the computer array 20, such as database 28. According to one embodiment, a different time-angle plot is stored for each satellite. In one embodiment, the curve 18 is stored in the database 28, but the data points on the plot are not stored there, to reduce the storage space needed for each time-angle plot. The data points may be stored elsewhere, and only the curve 18 is stored in database 28 for access by the computer array 20. The multiple computer processors in the computer array 20 use the curve 18 on the time-angle plot to estimate the maneuver times and iterate through various subsets of targets to find the highest value subset, as described above. Thus, when the interative process in step 114 begins on the computer array 20, the values of the targets and the curve 18 are already calculated and stored in the database 28 for access by the computer array 20.

According to one embodiment, the iterative solving step 114 produces a data file with the selected ordered subset of targets and the imaging time for each target. In one embodiment, this file does not include the estimated maneuver times, because these will be replaced by calculated times, as described above. Thus, the data file includes a list of targets in order and the imaging time for each target. In exemplary embodiments, this data file is passed to the second computer array 22 as input to perform the simulating of the pointing path in step 116. Once the first computer array 20 has passed the data file with the ordered subset to the second computer array 22, the first computer array 20 can begin iterations on another satellite imaging problem, for a different satellite or a different imaging window.

The second computer array 22 simulates the pointing path in step 116. The array 22 performs the parallel processing described above with respect to FIG. 6, to simulate various pointing paths with one or more targets removed, and to calculate the maneuver times. The second array 22 outputs a final pointing path, which is then checked and translated into commands for the satellite. The final pointing path is then transmitted to a transmitter 24 such as an antenna or telescope, and then transmitted by the transmitter 24 to the satellite 26. The satellite will execute the maneuvers to follow the path and image the targets in the path.

As explained above, the final pointing path will likely include fewer targets than were included in the ordered subset produced by the iterative solving 114. The number of targets dropped while simulating the pointing path 116 depends at least in part on the accuracy of the time-angle plot and the degree of optimism used in the estimated maneuver times (from curve 18). For example, the number of dropped targets generally will be greater when the estimated maneuver times are 3% optimistic, as compared to 1% optimistic. The accuracy of the maneuver estimates can be varied, with greater accuracy leading to fewer dropped targets. However, estimating the maneuver times with greater accuracy also requires more computing time, which reduces the number of iterations possible through the traveling salesman problem. A simpler estimation is faster and enables more iterations through the problem, but potentially creates more dropped targets during the simulating 116. Thus, there is a balance between the number of dropped targets and the accuracy of the estimated maneuver times.

Figure 3:
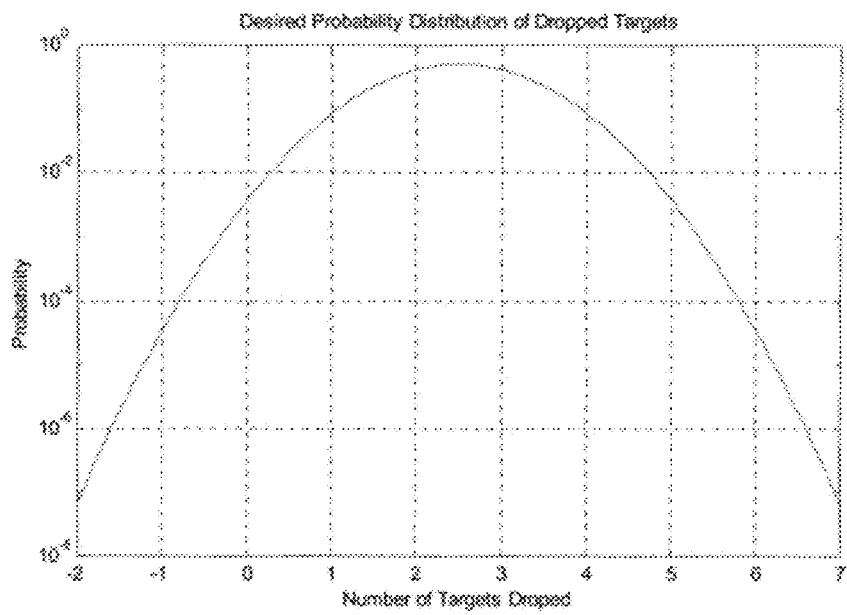
FIG. 3 is a probability plot, showing probability versus the number of targets removed from a subset of targets, according to an exemplary embodiment of the invention.

FIG. 3 shows an example of such a balance, according to an exemplary embodiment of the invention. FIG. 3 plots the number of targets dropped on the x-axis, and the probability on the y-axis, to show the probability that a particular number of targets will be dropped when the pointing path is generated. The shape of this curve can be tailored as desired by changing the accuracy or simplicity of the maneuver time estimates. A sharper curve centered closer to zero dropped targets requires a longer computing time to calculate more accurate estimated maneuver times. In this particular example, the curve centers around 2-3 targets dropped. The probability that 7 targets will be dropped is much lower. The portion of the curve to the left of zero shows the probability that the number of targets in the subset does not fill the available imaging time, so that extra time during the imaging pass is wasted. The curve is shifted to the right to reduce the probability that a pointing path with this wasted time will be generated.

In another embodiment, a method of solving a satellite imaging problem also includes selecting the targets in the group, before the values for the targets are calculated in step 110 (in FIG. 5A). This selection can be done prior to the calculation window, or it can actually extend into the calculation window. The selection of targets for the group can be performed by a computer system, such as by calculating which targets will be in view of the satellite during the pass. This computer system may be the same as the computer system 25 (in FIG. 4), or it may be a different computer system that passes the target information to computer system 25 or makes it available in a database accessible by computer system 25. Selecting the targets in the group can also include adding new targets to the group or deleting unwanted targets from the group.

In embodiments of the invention as described herein, the calculation of maneuver times is shifted from the iterative phase to the simulation phase, and estimated maneuver times are used during iterations. These estimates can be taken from a time-angle plot, and can be optimistic time estimates. The computational time for each iteration is reduced, and more iterations can be accomplished during the computational window to search for a better subset of targets to maximize the value of the targets and minimize the cost.

Although the present invention has been described and illustrated in respect to exemplary embodiments, it is to be understood that it is not to be so limited, since changes and modifications may be made therein which are within the full intended scope of the this invention.

What is claimed is:

1. A method for determining a pointing path of a satellite for imaging a group of targets, each target having a value, the method comprising:

determining by a computer system an estimated cost of reorienting the satellite between two targets in the group, wherein the estimated cost comprises an estimated maneuver time for reorienting the satellite between the two targets;

generating by the computer system an ordered subset of the targets that maximizes a total sum of the values of the targets in the subset and minimizes a total sum of the estimated costs of reorienting the satellite between ordered pairs of targets in the subset;

calculating by the computer system an actual maneuver time for reorienting the satellite between the ordered pairs of targets in the subset;

modifying by the computer system the ordered subset based on the calculated actual maneuver times; and generating by the computer system a pointing path for passing to the satellite for imaging the targets in the modified ordered subset, wherein determining the estimated cost of reorienting comprises obtaining the estimated maneuver time from a curve fit for maneuver time-angle data.

2. The method of claim 1, wherein the estimated maneuver time for reorienting the satellite between two targets is less than the calculated actual maneuver time for reorienting the satellite between the two targets.

3. The method of claim 1, wherein the curve fit is about 1-3% less than the best curve fit for the data.

4. The method of claim 1, further comprising transmitting the pointing path by a transmitter to the satellite.

5. The method of claim 4, further comprising imaging by the satellite the targets in the pointing path.

6. The method of claim 5, further comprising displaying an image of a target.

7. The method of claim 1, wherein modifying the ordered subset comprises removing one or more targets from the subset based on a view angle constraint of the satellite.

8. The method of claim 7, wherein modifying the ordered subset comprises simulating a plurality of pointing paths, one or more pointing paths having one or more targets removed.

9. The method of claim 8, wherein generating the pointing path comprises discarding simulated pointing paths based on the view angle constraint, and selecting the pointing path with the highest total sum of the values of the targets that does not violate the view angle constraint.

10. The method of claim 1, wherein generating the ordered subset comprises iteratively solving for the ordered subset.

11. The method of claim 10, wherein iteratively solving comprises selecting a first subset of targets that satisfies an imaging window constraint, calculating a sum of the values of the targets in the first subset, selecting a second subset of targets that satisfies the imaging window constraint, calculating a sum of the values of the targets in the second subset, and comparing the sums.

12. The method of claim 1, wherein modifying the ordered subset comprises replacing the estimated maneuver times with the calculated actual maneuver times.

13. The method of claim 1, wherein the computer system comprises first and second arrays of computer devices, and wherein generating the ordered subset is done by the first array, and generating the pointing path is done by the second array.

14. The method of claim 13, further comprising passing a data file having the ordered subset by the first array to the second array.

15. The method of claim 1, wherein the computer system comprises first and second arrays of computer devices and a database, and wherein determining the estimated cost comprises accessing by the first array an optimistic curve fit on a time-angle plot stored in the database, and wherein generating the ordered subset comprises iteratively solving by the first array for the ordered subset, and further comprising passing the ordered subset by the first array to the second array, and wherein calculating the actual maneuver times, modifying the ordered subset, and generating the pointing path are done by the second array.

16. A method for determining a pointing path of a satellite for imaging a group of targets, each target having a value, the method comprising:

determining by a computer system an estimated cost of reorienting the satellite between two targets in the group, wherein the estimated cost comprises an estimated maneuver time for reorienting the satellite between the two targets;

generating by the computer system an ordered subset of the targets that maximizes a total sum of the values of the targets in the subset and minimizes a total sum of the estimated costs of reorienting the satellite between ordered pairs of targets in the subset;

calculating by the computer system an actual maneuver time for reorienting the satellite between the ordered pairs of targets in the subset;

modifying by the computer system the ordered subset based on the calculated actual maneuver times; and generating by the computer system a pointing path for passing to the satellite for imaging the targets in the modified ordered subset, wherein modifying the ordered subset comprises removing one or more targets from the subset based on a view angle constraint of the satellite.

17. The method of claim 16, wherein modifying the ordered subset comprises simulating a plurality of pointing paths, one or more pointing paths having one or more targets removed.

18. The method of claim 17, wherein generating the pointing path comprises discarding simulated pointing paths based on the view angle constraint, and selecting the pointing path with the highest total sum of the values of the targets that does not violate the view angle constraint.

19. A method for determining a pointing path of a satellite for imaging a group of targets, each target having a value, the method comprising:

determining by a computer system an estimated cost of reorienting the satellite between two targets in the group, wherein the estimated cost comprises an estimated maneuver time for reorienting the satellite between the two targets;

generating by the computer system an ordered subset of the targets that maximizes a total sum of the values of the targets in the subset and minimizes a total sum of the estimated costs of reorienting the satellite between ordered pairs of targets in the subset;

calculating by the computer system an actual maneuver time for reorienting the satellite between the ordered pairs of targets in the subset;

modifying by the computer system the ordered subset based on the calculated actual maneuver times; and generating by the computer system a pointing path for passing to the satellite for imaging the targets in the modified ordered subset, wherein the computer system comprises first and second arrays of computer devices and a database, and wherein determining the estimated cost comprises accessing by the first array an optimistic curve fit on a time-angle plot stored in the database, and wherein generating the ordered subset comprises iteratively solving by the first array for the ordered subset, and further comprising passing the ordered subset by the first array to the second array, and wherein calculating the actual maneuver times, modifying the ordered subset, and generating the pointing path are done by the second array.

* * * * *